May 10, 1960 — A. M. HURTER — 2,935,993
LIQUID PROPORTIONER

Filed Jan. 26, 1959 — 3 Sheets-Sheet 1

Inventor
ALFRED M. HURTER
By
Attorney

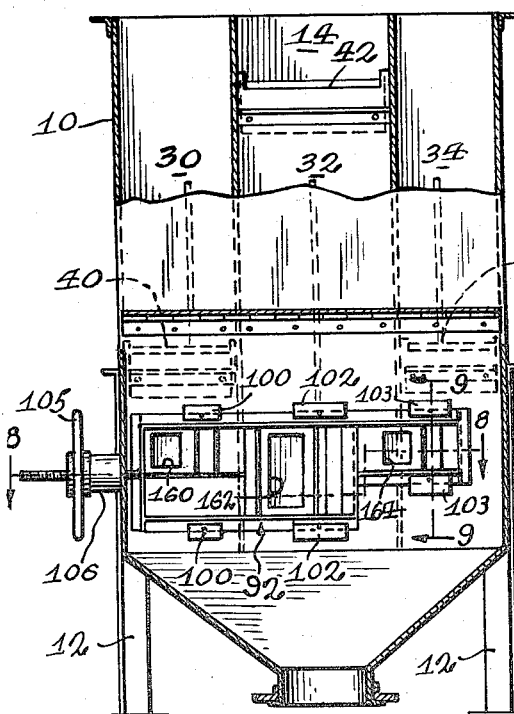
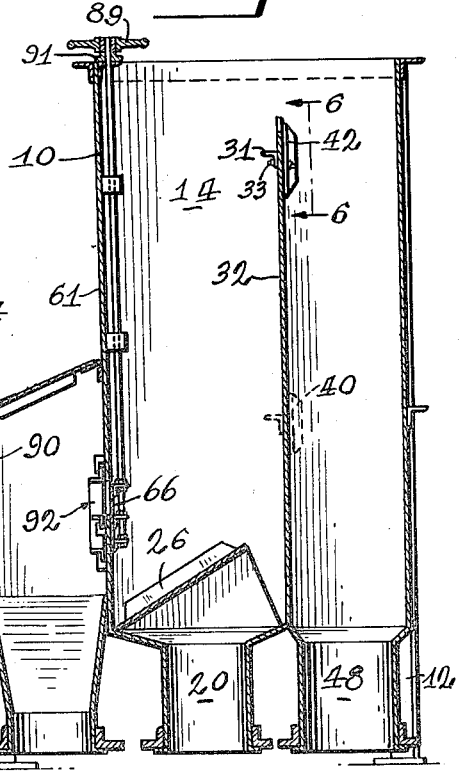
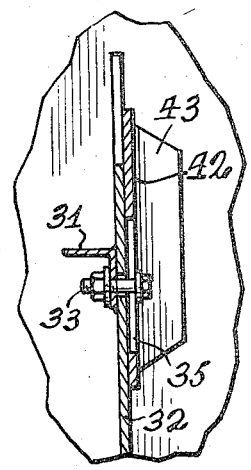
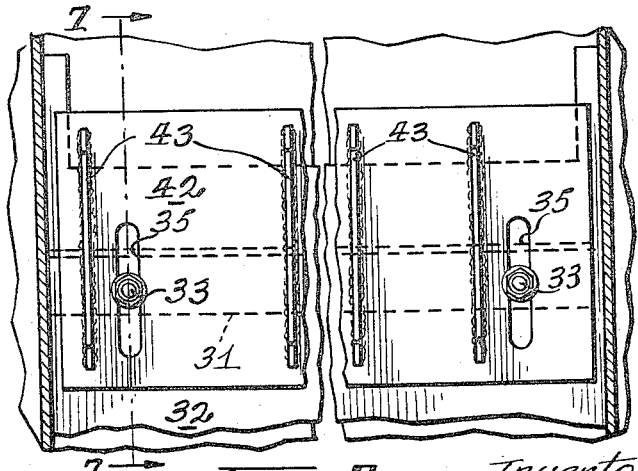

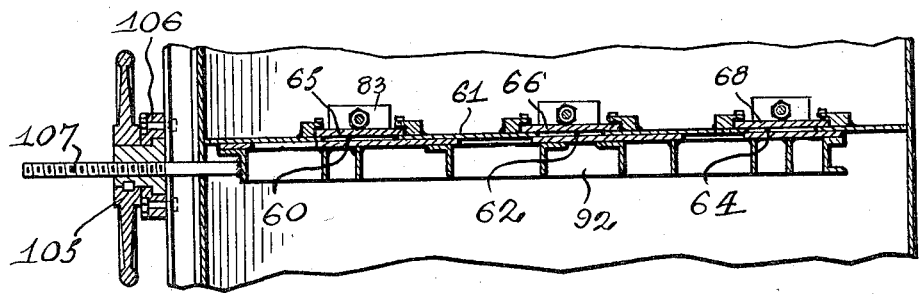
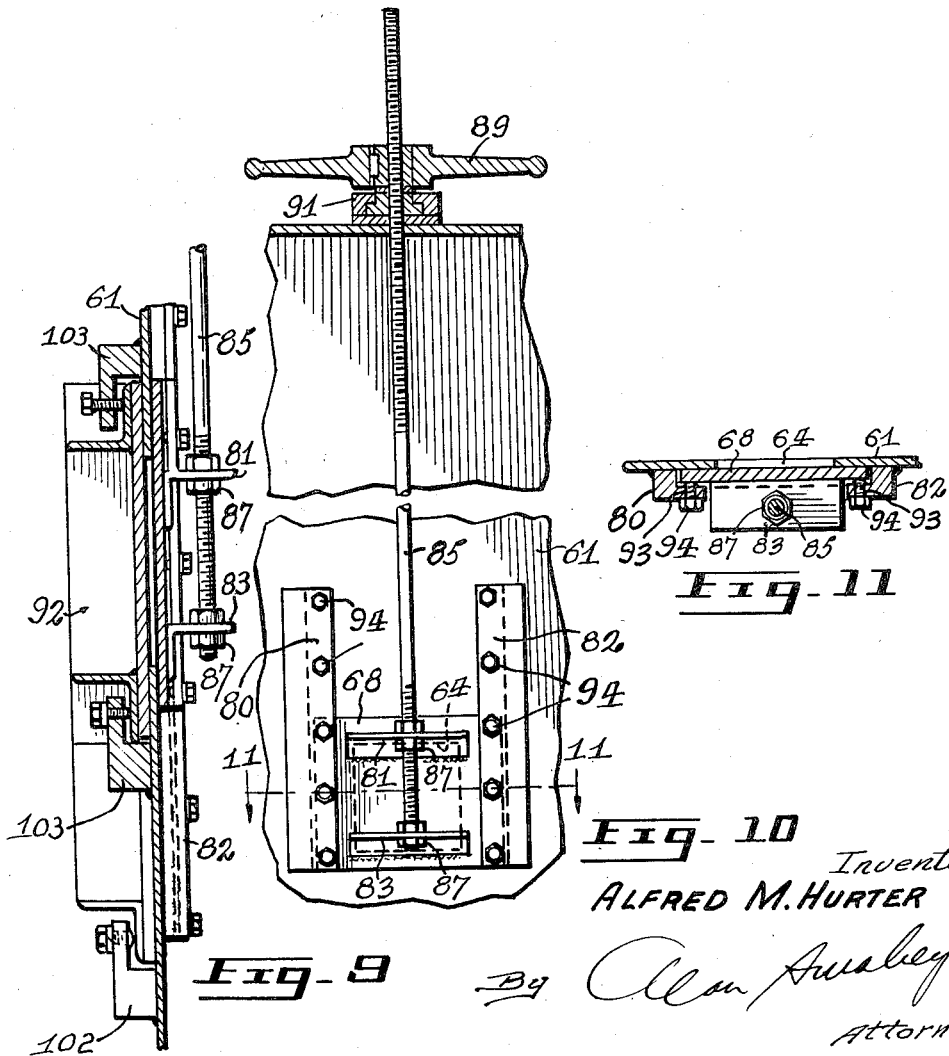

United States Patent Office 2,935,993
Patented May 10, 1960

2,935,993

LIQUID PROPORTIONER

Alfred M. Hurter, Lakeside, Quebec, Canada, assignor to Stadler, Hurter & Company Application January 26, 1959, Serial No. 789,088

4 Claims. (Cl. 137—266)

The present invention relates to a proportioning device for combining liquid streams in adjustable proportions such as, for example, the proportioning of various pulps for paper-making operations.

Liquid proportioning devices must perform two functions: They must permit various types of liquids, slurries, pulps, and/or water to be brought together in various proportions, and they must permit variations in the total volume discharged from the proportioning device while maintaining the proportions constant. In other words, it must be possible to vary at will the ratio between the incoming streams and it must also be possible to hold constant the ratio between the various streams to be combined while varying the total volume of throughput.

This has been accomplished in the past by a variety of means involving revolving gates, Ferris wheels, orifice gates, as well as complicated instrumentation systems involving flow measuring devices such as Venturi tubes, rotameters and the like.

The orifice gate type of proportioner is the simplest and if properly constructed can be made to give reasonably accurate results. While it is not difficult to arrange for varying the ratio between streams, since adjustable gates are all that is required, the main problem with this type of proportioner has always been that of varying the total throughput of the combined streams while maintaining constant the ratio between the various streams. Varying the throughput generally meant resetting the gates for every stream and to maintain the respective ratios constant necessitated some rather complicated figuring.

Attempts have been made to overcome this disadvantage: For example one prior art proportioner construction utilized a lever arrangement making use of the geometry of similar triangles to accomplish the desired overall control. However, to vary the ratio they have to move the vertex of the triangular lever arrangement, and the whole machinery is somewhat complicated.

The present invention aims to provide an orifice type proportioner which overcomes the problem of control of total volume throughput in a simple practical manner. More specifically, a preferred construction includes a main tank or casing which is divided into a number of compartments, for example in the case of proportioning for newsprint production, three (3): one for sulphite, one for groundwood and one for broke. The incoming streams are fed into these compartments and a deflector is provided over each incoming stream to prevent splashing and to prevent turbulence affecting the orifice. An overflow is provided for each compartment so that a constant head may be obtained, and each overflow is fitted with an adjustable weir which permits some variation in crest height setting.

Preferably, some means, for example pneumatic level controllers, are utilized to maintain an absolutely constant level in the compartments by throttling the incoming stream or by automatically adjusting the overflow weir, since with a simple fixed overflow variations in liquid level are apt to occur if there is any considerable fluctuation in incoming flow.

To adjust the flow from each compartment to a certain fraction of the combined main flow, the inside of each compartment is fitted with a vertical sliding gate over a discharge orifice. The orifices in the individual compartments, although varying in height, are all of equal width, and the vertical gates are operated by suitable means: pneumatic valve positioners, hand wheels, or the like, so that the ratio between the various streams is adjusted as required to give the desired composition of the combined flow. In order to control this proportioned output from the compartments, a single large gate is provided on the exterior of the main casing which operates to control all the orifices simultaneously and in a direction transverse to the individual vertical gates. Since all the orifices are the same width, the movement of the large exterior gate varies the throughput from each compartment in the same proportions so that the ratio between streams is kept constant while the total throughput is varied.

The main transverse gate or production gate may also be controlled by a hand wheel or preferably by a pneumatic, hydraulic, or electric positioner controlled by the process for which the proportioner is providing the controlled liquid composition.

Having thus generally described the nature of the invention, particular reference will be made to the accompanying drawing, in which:

Figure 4 is a view corresponding to Figure 2 and partially in section along the line 4—4 of Figure 3 to illustrate the construction of the outer main slide gate more clearly, the upper front wall of the main casing also being partially broken away to show the internal adjustable weirs between the various intake compartments and their respective overflow compartments.

Figure 5 is a sectional view of the construction of Figure 3 along the line 5—5.

Figure 6 is an enlarged detail view of the central adjustable weir as seen along the line 6—6 of Figure 5 to illustrate the construction in more detail, this being typical of all the adjustable weirs.

Figure 7 is a sectional view of Figure 6 along the line 7—7 to further illustrate the preferred construction.

Figure 8 is a cross-sectional view of the construction shown in Figure 4 and along the line 8—8 to illustrate the construction of the main slide gate in more detail.

Figure 9 is a sectional view of Figure 4 along the line 9—9 to illustrate the construction of the main sliding gate more clearly.

Figure 10 is an enlarged detail view partially in section of one inner vertically sliding gate with its control handle as seen from the interior of the casing.

Figure 11 is a cross-sectional view of Figure 10 along the line 11—11 to show the construction more clearly.

Figure 1:
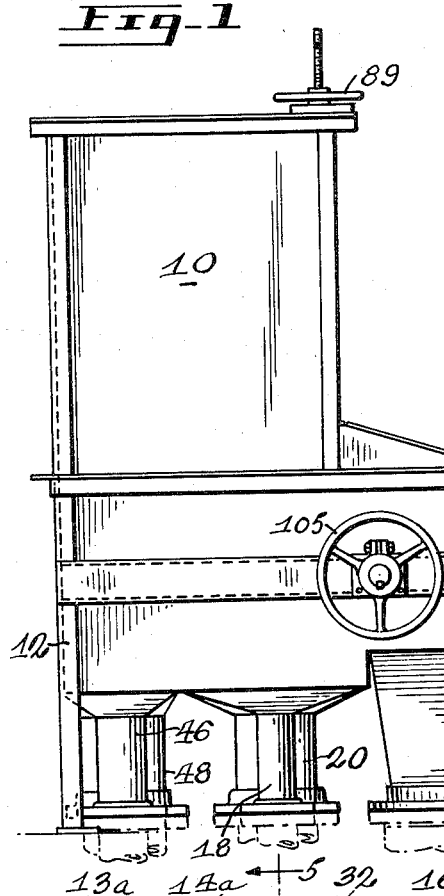
Figure 1 is a view in side elevation of a stock proportioner constructed in accordance with the invention.
Figure 2:
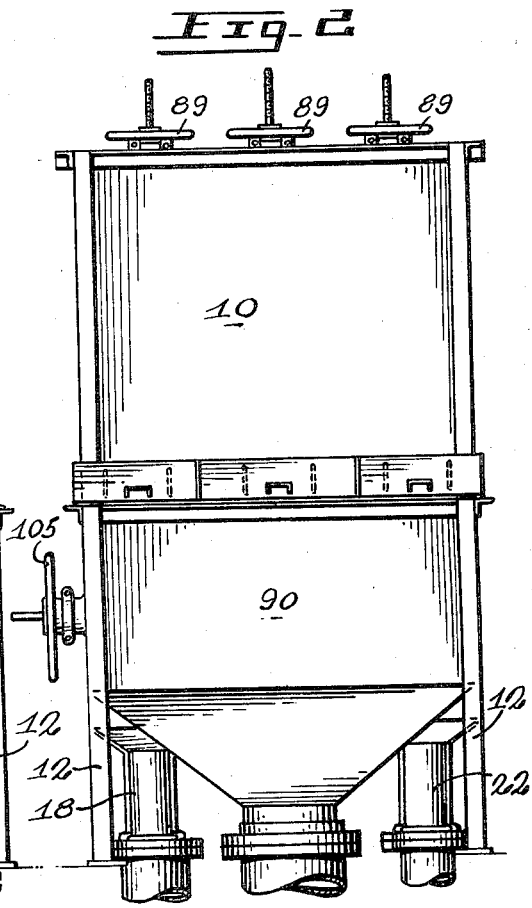
Figure 2 is a front view of the construction shown in Figure 1.
Figure 3:
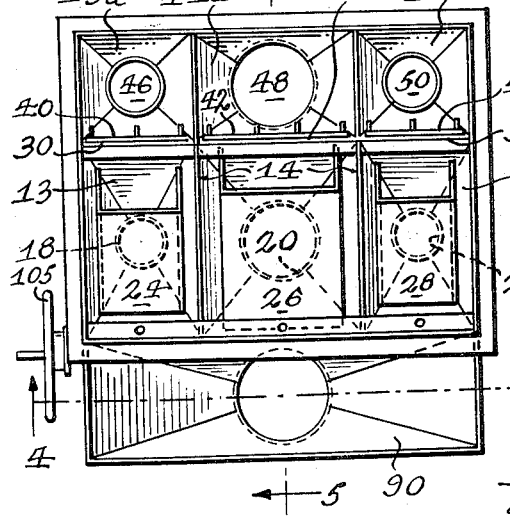
Figure 3 is a plan view of the construction shown in Figure 2 with the top cover and hand wheels removed for clarity.

With particular reference to Figures 1, 2 and 3 of the drawings, there is shown by way of illustration a preferred embodiment of a paper stock proportioner in accordance with the invention. This construction is about 5' x 5'6" in overall outside dimensions and about 9'6" high from the bottom of the supporting standards. This is sized for about a 300 ton per day newsprint operation and it will be appreciated that similar units could be built in different sizes for different operations. Also, although this was developed primarily for proportioning of various types of pulp for paper furnish, a similar unit could also be used for dilution ahead of the screening system; in other words, for the proportioning of stock and white water, and it is obvious that it would be used for the proportioning or dilution of any type of liquids or slurries.

In the drawings, a main casing or vat 10 is shown as being supported on vertical standards 12 with the interior divided into separate compartments 13, 14, and 16 provided with entry ducts 18, 20 and 22 respectively. The compartments 13, 14, 16 are, for example, for sulphite, groundwood and broke, and deflectors 24, 26, 28 are provided over the interior end of the respective ducts to prevent splashing and turbulence. The compartments 13, 14, 16 are each divided transversely by overflow walls 30, 32, 34 and each overflow is fitted with an adjustable weir which permits crest height setting.

The overflow wall 32 is fitted with a weir 42 as shown in more detail in Figures 5, 6 and 7, while the overflow walls 30, 34 are fitted with similar weir arrangements 40, 44.

As shown in Figures 6 and 7, for example, the upper portion of the wall 32 is provided with a transverse reinforcing angle 31 and bolts 33 are inserted through the angle 31 and wall 32 to an adjustable engagement with elongated slots 35 provided in the weir 42. The weir 42 is reinforced by plates 43 at spaced apart intervals, as shown, and by the elongated slots 35 can be adjusted relative to the upper terminal edge of the wall 32. Outlet ducts 46, 48, 50 are provided in each of the overflow compartments 13a, 14a, 16a, as shown in Figures 1, 2 and 3. Preferably, pneumatic level controllers are utilized to maintain an absolutely constant level in compartments 13, 14, 16. Since such arrangements are varied and well known they are not illustrated in the present drawings.

The inside of each compartment is fitted with a vertical sliding gate over an orifice which is sized according to the production required. As shown in Figure 8, the orifices 60, 62, 64 are provided in the front partitioning wall 61 and the respective sliding gates 65, 66, 68 are mounted in the inner face of this wall in spaced parallel slides. A typical construction is shown in detail in Figures 10 and 11, which refer to the sliding gate 68, masking the orifice 64 of the compartment 16. As shown, angles 80, 82 are welded at each side of the orifice 64 to provide a slide guide for the gate plate 68. The gate plate 68 is provided with spaced angles 81, 83 suitably bored to receive one end of a square threaded shaft 85 extending vertically downwards from the top of the casing 10 as shown. The lower end of the shaft 85 is connected to the angles 81, 83 by nuts 87 while the upper end is threadedly engaged by a hand wheel 89 mounted on a bearing 91 secured to the upper front portion of the casing. With this arrangement the slide gate 68 can be raised or lowered to vary the vertical dimension of the orifice 64. To maintain the surface of the slide gate 68 in sealing contact with the portions of the partition surrounding the orifice 64, a plurality of machine screws 94 are threadedly engaged in suitable tapped openings 93 disposed in spaced relationship along the angles 80, 82. By adjustment of the screws 92 the gate 68 can be maintained in sealing sliding contact with the compartment end wall 61.

It is to be noted that the orifices 60, 62, 64 are all of equal width, although they vary in height and can be adjusted in their longitudinal dimension or height by the respective sliding gates. This is important in the present invention in that to provide an overall control of the flow from the orifices 60, 62, 64 to the main mixing and discharge compartment 90, a single relatively large slide gate 92 is provided which operates across all orifices simultaneously in a direction transverse to the individual vertical slide gates. As shown most clearly in Figures 4, 8 and 9, the slide gate 92 is mounted for sliding movement on the front face of the compartment wall 61 by spaced apart sets of angles 100, 102, 103. The gate 92 is shaped to conform with the location and size of the individual orifices 60, 62, 64 and is provided with corresponding orifices 160, 162, 164 which can be brought into register transversely by the rotation of a controlling hand wheel 105. As shown most clearly in Figure 8, the hand wheel 105 is mounted on a suitable bearing 106 at the side of the main mixing compartment 90 and engages a threaded shaft 107 secured to the end of the slide gate 92.

It will be appreciated that other means might be utilized to operate the external slide gate 92; for example, it might be operated by an air cylinder, electric motor, or similar arrangement as is well known in the art.

As previously described, the main feature of the invention resides in maintaining all the individual orifices leading from the various stock requirements at an equal width regardless of variance in height and maintaining the overall control on all orifices by a single gate operating across all orifices simultaneously whereby, as all orifices are of the same width, the throughput on each stream is varied in the same proportions so that the ratio between streams is kept constant while the total throughput is varied.

I claim:

1. A proportioner for combining various liquids, slurries or pulps in adjustable ratios including multiple partitioned liquid inlet compartments, means to provide a flow of liquid to each of said compartments, means to maintain a predetermined constant head of liquid in each compartment, a discharge orifice in each compartment leading to a common mixing and discharge outlet, an inner gate mounted within each of said stock inlet compartments for sliding movement across each of the respective discharge orifices in one direction, and an outer gate mounted exteriorly of said stock inlet compartments for sliding movement in a direction transverse to said first gates, said outer gate being common to all discharge orifices, said inner and outer gates operating to maintain one dimension of each of said orifices constant with respect to the corresponding dimensions of the other orifices while relatively varying the other dimensions of the orifices, whereby by said inner gates the discharge flow from each of said compartments can be set to a predetermined ratio relative to the flow from the others of said compartments, and the said outer gate is adapted to proportionately control the total throughput from all of said compartments.

2. A proportioner as claimed in claim 1, wherein said inner gates are slidably mounted within each of said compartments for vertical adjustment and said common outer gate is slidably mounted exteriorly of said compartments to operate horizontally.

3. A proportioner for combining various liquids, slurries or pulps in adjustable ratios comprising a casing partitioned internally to provide a plurality of liquid inlet compartments and a corresponding plurality of juxtaposed liquid overflow compartments, an inlet conduit connected to each of said liquid inlet compartments and an outlet conduit connected to each of said overflow compartments, an adjustable weir between each of said inlet and overflow compartments whereby a predetermined constant head may be maintained in each of said inlet compartments, a common control outlet compartment and a combined discharge outlet leading from said control outlet compartment, discharge orifices in each of said stock inlet compartments leading into said control outlet compartment, an inner gate mounted within each of said stock inlet compartments for sliding movement across each of the respective discharge orifices in one direction, and an outer gate mounted exteriorly of said stock inlet compartments for sliding movement in a direction transverse to said first gates, said outer gate being common to all discharge orifices, said inner and outer gates operating to maintain one dimension of each of said orifices constant with respect to the corresponding dimensions of the other orifices while relatively varying the other dimension of the orifices, whereby the dimensions of each of said discharge orifices may be preadjusted by said inner gates to deliver a flow varying in ratio to the others of said orifices and by said outer gate the said ratio between said discharge flows is kept constant while the total throughput to said common control outlet is varied.

4. A proportioner as claimed in claim 3, wherein said inner gates are slidably mounted within each of said compartments for vertical adjustment and said common outer gate is slidably mounted exteriorly of said compartments to operate horizontally.

References Cited in the file of this patent

UNITED STATES PATENTS 2,730,118    Cowan ------------------ Jan. 10, 1956